(12) United States Patent
Wohlgemuth et al.

(10) Patent No.: US 7,644,147 B1
(45) Date of Patent: Jan. 5, 2010

(54) REMOTE NETWORK DEVICE MANAGEMENT

(75) Inventors: Aron Wohlgemuth, Sunnyvale, CA (US); Amit Avivi, Sunnyvale, CA (US); Yuval Cohen, Raanana (IL)

(73) Assignee: Marvell International Ltd., Hamilton (BM)

( * ) Notice: Subject to any disclaimer, the term of this patent is extended or adjusted under 35 U.S.C. 154(b) by 802 days.

(21) Appl. No.: 11/090,418

(22) Filed: Mar. 25, 2005

(51) Int. Cl.
*G06F 15/173* (2006.01)

(52) U.S. Cl. ...................................... 709/223
(58) Field of Classification Search .................. 709/223
See application file for complete search history.

(56) References Cited

U.S. PATENT DOCUMENTS

| | | | |
|---|---|---|---|
| 5,793,976 A * | 8/1998 | Chen et al. ................... | 709/224 |
| 6,570,884 B1 * | 5/2003 | Connery et al. ............. | 370/419 |
| 6,757,725 B1 * | 6/2004 | Frantz et al. ................. | 709/223 |
| 6,920,106 B1 * | 7/2005 | Chou et al. ................... | 370/229 |
| 2003/0035425 A1 * | 2/2003 | Abdollahi et al. ........... | 370/392 |
| 2003/0095545 A1 * | 5/2003 | Ngai ............................ | 370/352 |
| 2004/0190546 A1 * | 9/2004 | Jackson ....................... | 370/463 |
| 2004/0208197 A1 * | 10/2004 | Viswanathan ............... | 370/466 |
| 2005/0147032 A1 * | 7/2005 | Lyon et al. ................... | 370/229 |

FOREIGN PATENT DOCUMENTS

WO   WO 0118659 A1 *   3/2001

OTHER PUBLICATIONS

Pfister, Gregory F.—"An Introduction to the InfiniBand Architecture"—IBM Enterprise Server Group, Server Technology and Architecture, Austin, TX, 78758, USA—Aug. 7, 2002—16 pages.
Pentakalos, Odysseas—"An Introduction to the InfiniBand Architecture"—windows 2000 Performance Guide—Feb. 4, 2002—8 pages.

* cited by examiner

*Primary Examiner*—John Follansbee
*Assistant Examiner*—Imad Hussain (57) ABSTRACT

An apparatus having a corresponding method comprises a memory; a plurality of ports comprising one or more network ports to send and receive data packets and to receive management packets, wherein each of the management packets comprises one or more commands, and wherein the commands comprise one or more of the group consisting of a command to read data from the memory, and a command to write data to the memory, and a central processing unit (CPU) port to transmit packets addressed to a CPU; a forwarding engine to transfer the data packets between the ports according to a forwarding table stored in the memory; a protocol unit to identify the management packets; and a management unit to execute the commands; wherein the management packets bypass the CPU port.

15 Claims, 6 Drawing Sheets

REMOTE NETWORK DEVICE MANAGEMENT

BACKGROUND

The present invention relates generally to managing network devices such as network switches. More particularly, the present invention relates to managing network devices remotely.

Figure 1:
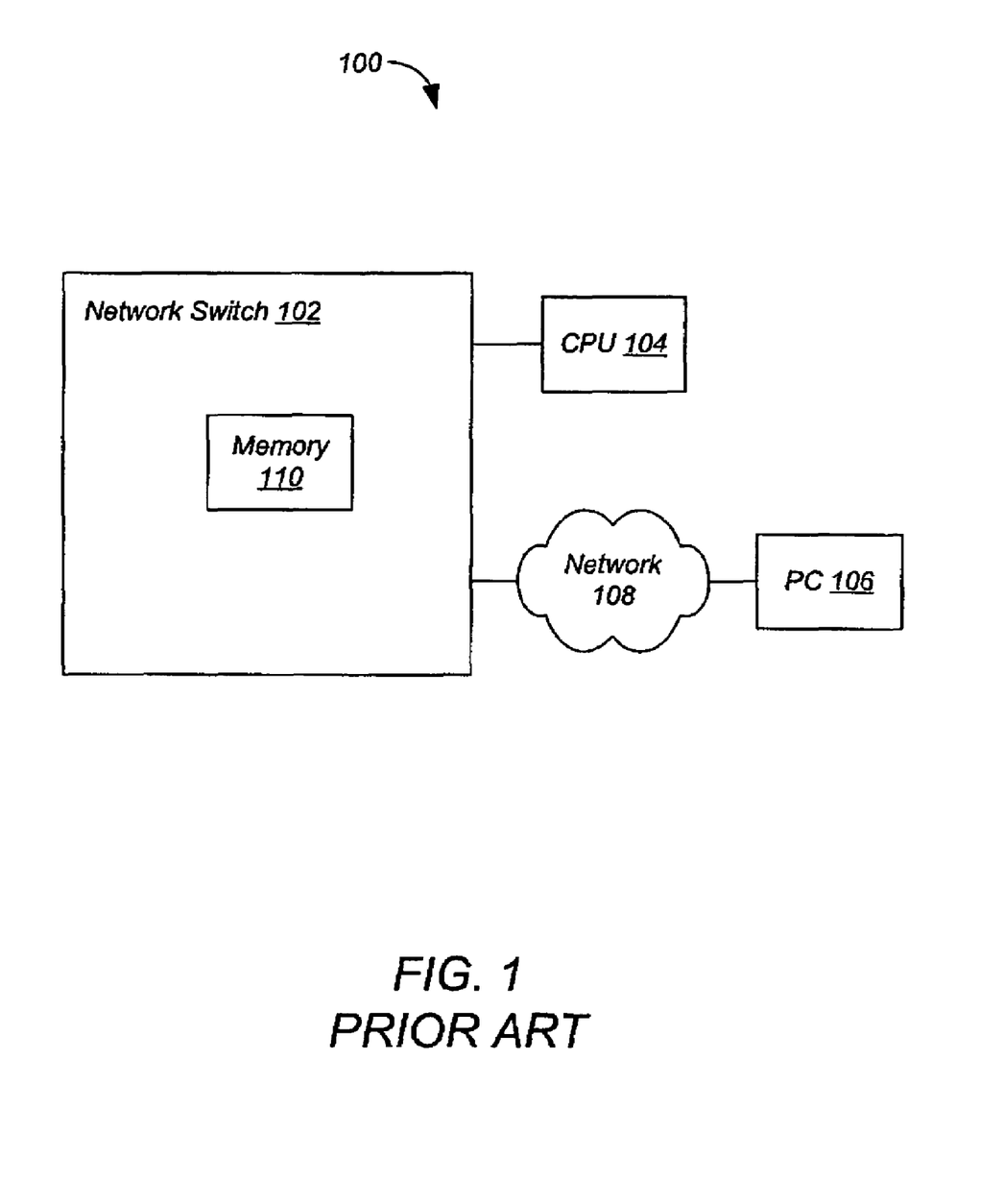
FIG. 1 shows a conventional network switch management system comprising a network switch in communication with a central processing unit and a personal computer over a network.

FIG. 1 shows a conventional network switch management system 100 comprising a network switch 102 in communication with a central processing unit (CPU) 104, and in communication with a personal computer 106 over a network 108. Network switch 102 comprises a memory 110 that can include separate memories for storing packets and the forwarding tables that control the operation of network switch 102, as well as one or more configuration registers.

Remotely managing a network device such as network switch 102 requires reading from, and writing to, a switch memory such as memory 110, for example to modify the forwarding tables stored therein. Conventional techniques for reading from, and writing to, switch memory 110 generally require a significant contribution from a local CPU such as CPU 104. For example, according to the well-known Simple Network Management Protocol (SNMP), CPU 104 is required to execute the reads and writes.

Figure 2:
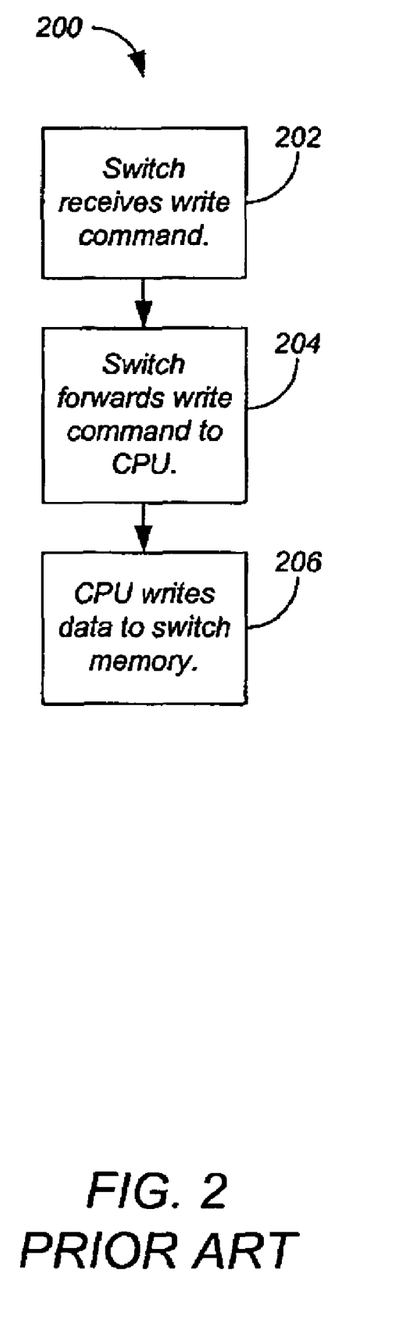
FIG. 2 shows a conventional SNMP process for writing to the switch memory of FIG. 1.

FIG. 2 shows a conventional SNMP process 200 for writing to switch memory 110. The SNMP write transaction requires that the write command received by switch 102 (step 202) be forwarded to CPU 104 for execution (step 204). CPU 104 then writes the data to switch memory 110 (step 206).

Figure 3:
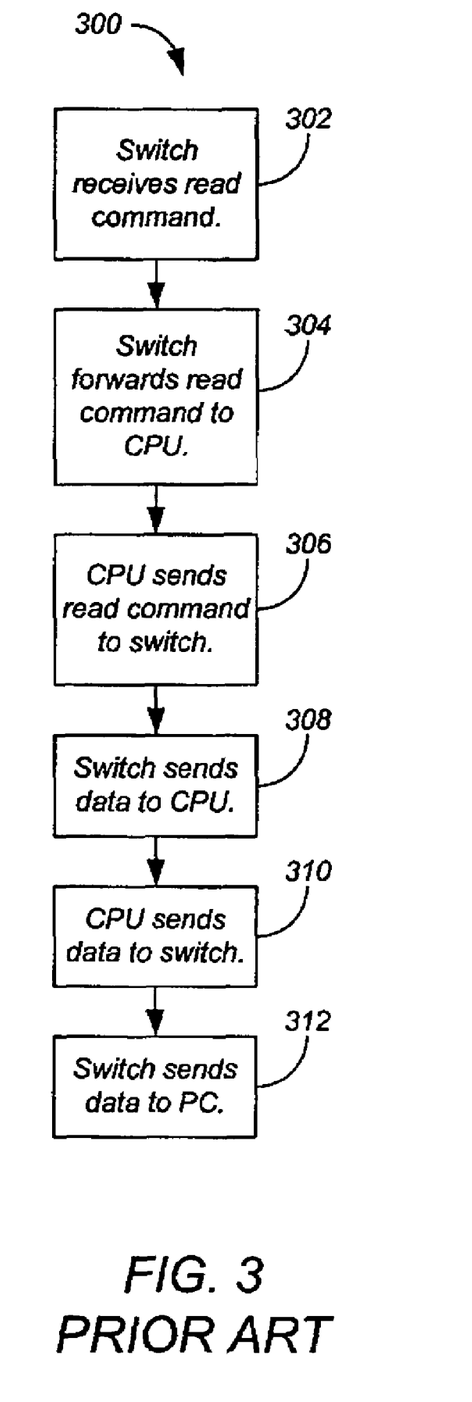
FIG. 3 shows a conventional SNMP process for reading from the switch memory of FIG. 1.

FIG. 3 shows a conventional SNMP process 300 for reading from switch memory 110. The SNMP read transaction requires that the read command received by switch 102 (step 302) be forwarded to CPU 104 for execution (step 304). CPU 104 then sends a read command to switch memory 110 (step 306), which returns the requested data to CPU 104 (step 308). CPU 104 then sends the requested data to switch 102 (step 310), which forwards the data to PC 106 (step 312).

Clearly these transactions burden CPU 104 significantly, thereby diverting CPU 104 from its normal functions, such as routing and the like.

SUMMARY

In general, in one aspect, the invention features an apparatus comprising: a memory; a plurality of ports comprising one or more network ports to send and receive data packets and to receive management packets, wherein each of the management packets comprises one or more commands, and wherein the commands comprise one or more of the group consisting of a command to read data from the memory, and a command to write data to the memory, and a central processing unit (CPU) port to transmit packets addressed to a CPU; a forwarding engine to transfer the data packets between the ports according to a forwarding table stored in the memory; a protocol unit to identify the management packets; and a management unit to execute the commands; wherein the management packets bypass the CPU port.

In some embodiments, the management unit, upon receiving one of the management packets comprising the one or more commands, stores the one or more commands in the memory, and executes the one or more commands only after one or more predetermined bits in the memory match a predetermined trigger pattern. In some embodiments, the CPU port receives a packet comprising a command to write the predetermined trigger pattern to the one or more predetermined bits in the memory; and the management unit writes the predetermined trigger pattern to the one or more predetermined bits in the memory. In some embodiments, the management unit executes the one or more commands only when the one or more predetermined bits in the memory match the predetermined trigger pattern during a predetermined interval following receiving the one of the management packets comprising the one or more commands. In some embodiments, one of the one or more network ports receives a trigger packet addressed to the CPU; wherein the forwarding engine transfers the trigger packet to the CPU port; and wherein the CPU port receives the packet comprising the command to write the predetermined trigger pattern to the one or more predetermined bits in the memory in response to the trigger packet. In some embodiments, a network switch comprises the apparatus. In some embodiments, an apparatus comprises the network switch; and a second network switch comprising the CPU; wherein the CPU transmits one or more of the management packets to the network switch.

In general, in one aspect, the invention features an apparatus comprising: means for storing data; plurality of port means comprising one or more network port means for sending and receiving data packets and for receiving management packets, wherein each of the management packets comprises one or more commands, and wherein the commands comprise one or more of the group consisting of a command to read data from the means for storing, and a command to write data to the means for storing, and central processing unit (CPU) port means for transmitting packets addressed to a CPU; forwarding engine means for transferring the data packets between the port means according to a forwarding table stored in the means for storing; protocol means for identifying the management packets; and management means for executing the commands; wherein the management packets bypass the CPU port means.

In some embodiments, the management means, upon receiving one of the management packets comprising the one or more commands, stores the one or more commands in the means for storing, and executes the one or more commands only after one or more predetermined bits in the means for storing match a predetermined trigger pattern. In some embodiments, the CPU port means receives a packet comprising a command to write the predetermined trigger pattern to the one or more predetermined bits in the means for storing; and wherein the management means writes the predetermined trigger pattern to the one or more predetermined bits in the means for storing. In some embodiments, the management means executes the one or more commands only when the one or more predetermined bits in the means for storing match the predetermined trigger pattern during a predetermined interval following receiving the one of the management packets comprising the one or more commands. In some embodiments, one of the one or more network port means receives a trigger packet addressed to the CPU; wherein the forwarding engine means transfers the trigger packet to the CPU port mean; and wherein the CPU port means receives the packet comprising the command to write the predetermined trigger pattern to the one or more predetermined bits in the means for storing in response to the trigger packet. In some embodiments, a network switch comprising the apparatus. In some embodiments, an apparatus comprises: the network switch; and a second network switch comprising the CPU; wherein the CPU transmits one or more of the management packets to the network switch.

In general, in one aspect, the invention features a method for an apparatus comprising a memory and a plurality of ports comprising one or more network ports and a central processing unit (CPU) port, the method comprising: sending and receiving data packets on the network ports; transferring the data packets between the ports according to a forwarding table stored in the memory, receiving management packets on the network ports, wherein each of the management packets comprises one or more commands, wherein the commands comprise one or more of the group consisting of a command to read data from the memory, and a command to write data to the memory; transmitting from the CPU port packets addressed to a CPU; identifying the management packets; executing the commands; and wherein the management packets bypass the CPU port.

Some embodiments comprise, upon receiving one of the management packets comprising the one or more commands, storing the one or more commands in the memory; and executing the one or more commands only after one or more predetermined bits in the memory match a predetermined trigger pattern. Some embodiments comprise receiving a packet on the CPU port, the packet comprising a command to write the predetermined trigger pattern to the one or more predetermined bits in the memory; and writing the predetermined trigger pattern to the one or more predetermined bits in the memory. Some embodiments comprise executing the one or more commands only when the one or more predetermined bits in the memory match the predetermined trigger pattern during a predetermined interval following receiving the one of the management packets comprising the one or more commands. Some embodiments comprise receiving a trigger packet addressed to the CPU on one of the one or more network ports; transferring the trigger packet to the CPU port; and receiving on the CPU port the packet comprising the command to write the predetermined trigger pattern to the one or more predetermined bits in the memory in response to the trigger packet.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present invention provide remote management of network devices without unnecessarily burdening the local CPU. Preferably the network device to be managed comprises a protocol unit to identify management packets and a management unit to execute the commands in the management packets without sending the commands to the local CPU (that is, the management packets bypass the CPU port in the network device). Thus the local CPU is unaffected by the remote management of the network device according to these embodiments. Embodiments of the present invention have other applications as well. For example, embodiments of the present invention are useful in chip debugging.

Some embodiments provide additional security by requiring a trigger packet be sent to the CPU to initiate execution of commands previously received by the network device. The CPU then writes a predetermined trigger pattern to one or more predetermined bits in the memory of the network device. The network device, on detecting the trigger pattern, executes the commands. Some embodiments provide further security by aging the commands, for example by requiring the trigger pattern be written within a predetermined interval after receiving the commands.

Figure 4:
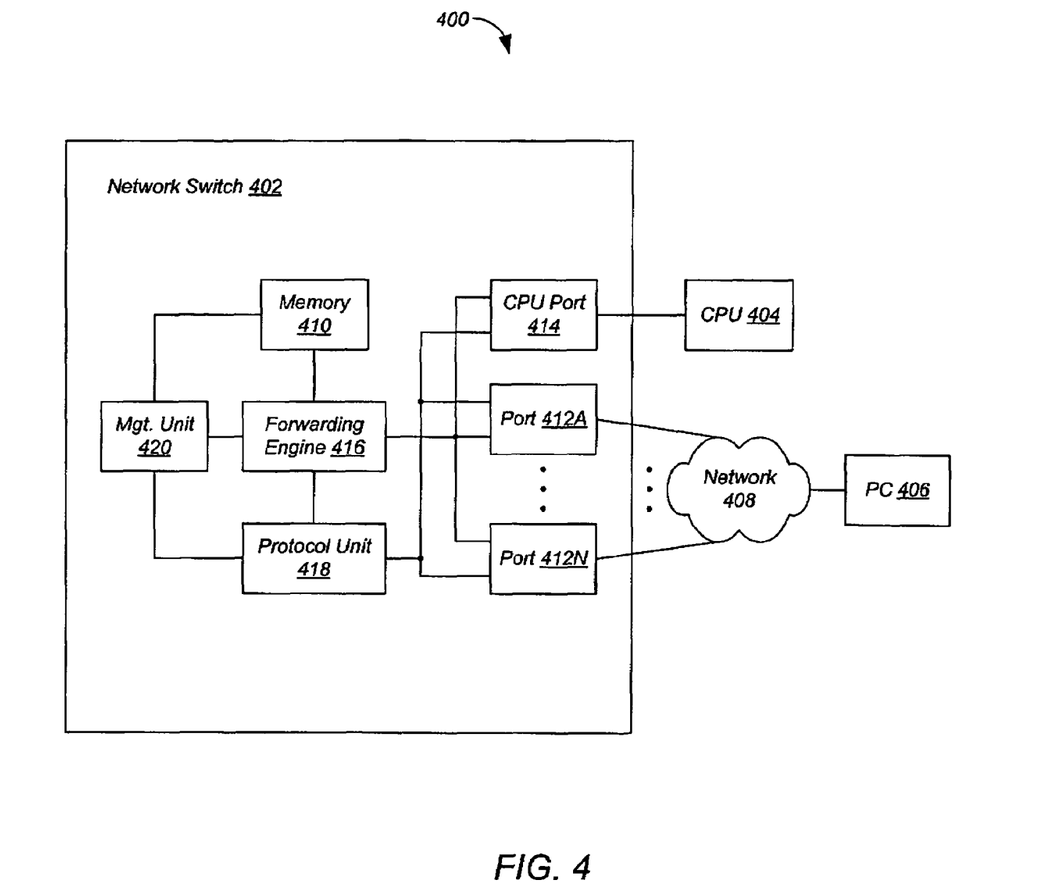
FIG. 4 shows a remote network switch management system according to a preferred embodiment of the present invention.

FIG. 4 shows a remote network switch management system 400 according to a preferred embodiment of the present invention. Although embodiments of the present invention are described with reference to remotely managing a network switch over a network, other embodiments remotely manage other sorts of network devices, and over other sorts of links, such as direct links.

Remote network switch management system 400 comprises a network switch 402 in communication with a local CPU 404, and in communication with a PC 406 over a network 408 such as a local-area network (LAN), wireless LAN, the Internet, and the like. Network switch 402 comprises a memory 410 that can include separate memories for storing packets and the forwarding tables that control the operation of network switch 402, as well as one or more configuration registers for network switch 402. Network switch 402 further comprises a plurality of ports comprising one or more network ports 412A through 412N to send and receive data packets and to receive management packets and a central processing unit (CPU) port 414 to transmit packets addressed to CPU 404, and to receive packets from CPU 404. Each of the management packets comprise one or more commands. The commands include commands to read data from memory 410 and commands to write data to memory 410, as described in detail below.

Network switch 402 further comprises a forwarding engine 416 to transfer data packets between ports 412, 414 according to a forwarding table stored in memory 410, a protocol unit 418 to identify the management packets, and a management unit 420 to execute the commands.

Figure 5:
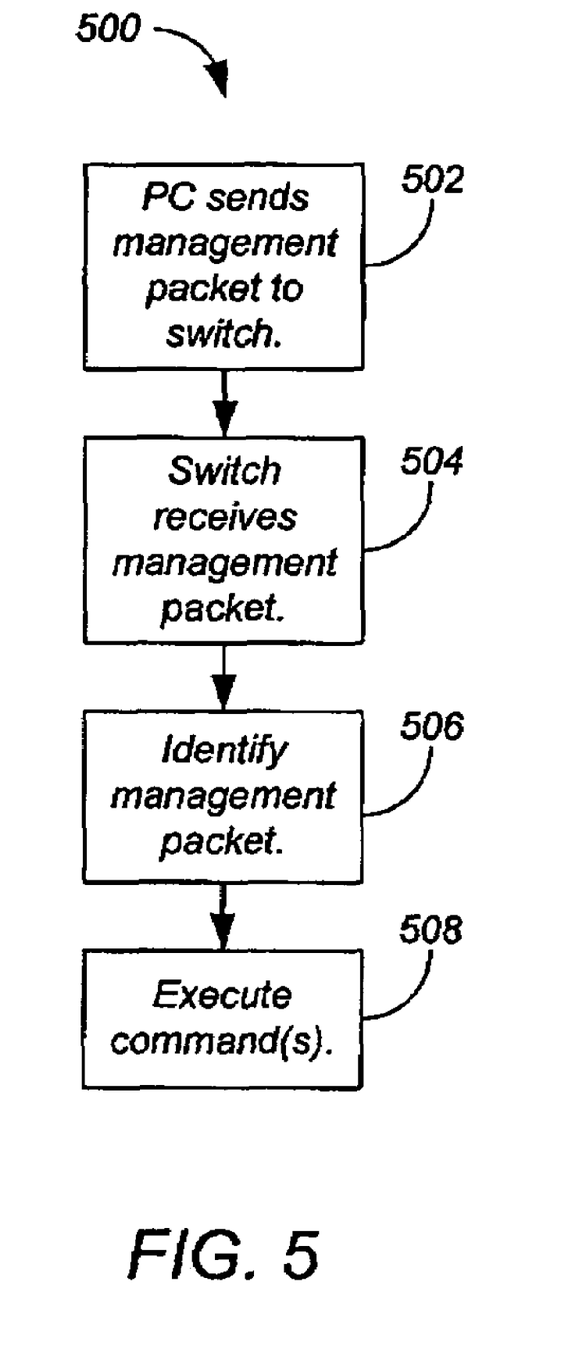
FIG. 5 shows a process for remotely managing the network switch of FIG. 4 according to a preferred embodiment.

FIG. 5 shows a process 500 for remotely managing network switch 402 according to a preferred embodiment. Personal computer 106 transmits a management packet to network switch 402 (step 502). The management packet comprises one or more commands and a management packet identifier.

The management packet traverses network 408, and arrives at network switch 402. One of network ports 112 receives the management packet (step 504). Protocol unit 418 identifies the management packet by the presence of the management packet identifier in the packet (step 506). Protocol unit 418 sends non-management packets to forwarding engine 416 to be forwarded according to well-known techniques, and sends management packets to management unit 420.

Management unit 420 executes the command(s) contained in the management packet (step 508). The commands can include commands to write data to one or more locations in memory 410, for example to modify the configuration registers or the forwarding table stored in memory 410. The commands can also include commands to read data from one or more locations in memory 410, for example to read the Management Information Base (MIB) statistics collected by network switch 402 and stored in memory 410. In the case of a read command, the requested data is packetized and returned to PC 406. Of course, other sorts of commands can be defined and implemented in this manner.

Embodiments using process 500 permit remote management of network switch 402 with no contribution from local CPU 404 at all. Other embodiments employ local CPU 404 only to provide additional security. One such embodiment is described below with reference to FIGS. 4 and 6.

Figure 6:
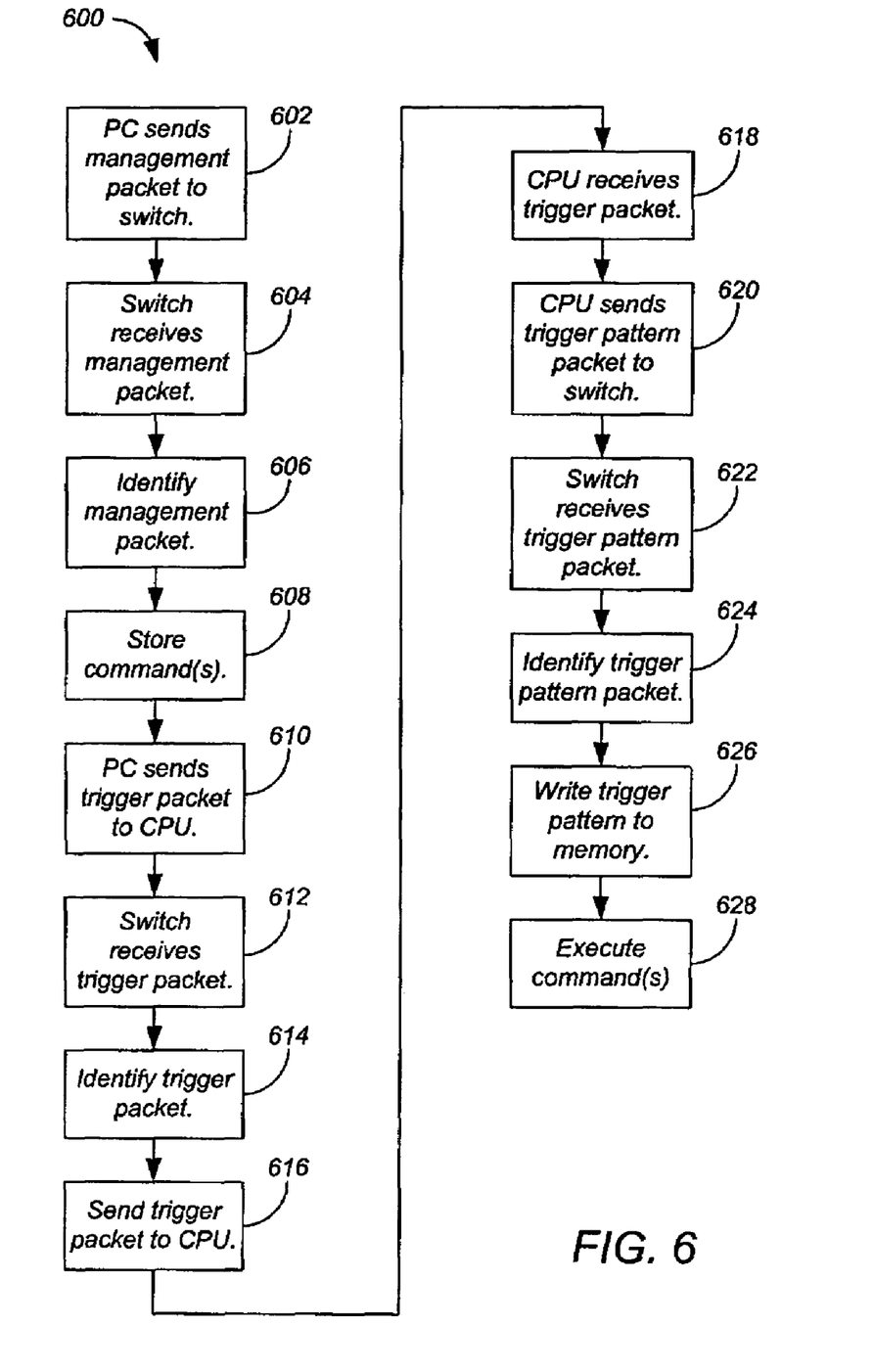
FIG. 6 shows a process for remotely managing the network switch of FIG. 4 according to a preferred embodiment providing additional security.

FIG. 6 shows a process 600 for remotely managing network switch 402 according to a preferred embodiment providing additional security. Personal computer 406 transmits a management packet to network switch 402 (step 602). The management packet comprises one or more commands and a management packet identifier.

The management packet traverses network 408, and arrives at network switch 402. One of network ports 412 receives the management packet (step 604). Protocol unit 418 identifies the management packet by the presence of the management packet identifier in the packet (step 606). Protocol unit 418 sends non-management packets to forwarding engine 416 to be forwarded according to well-known techniques, and sends management packets to management unit 420.

Management unit 420 stores the command(s) contained in the management packet in memory 410 (step 608). The commands can include the commands described above with reference to FIG. 5. To provide additional security, management unit 420 executes the stored commands only after one or more predetermined bits in memory 410 match a predetermined trigger pattern, as described in further detail below.

Personal computer 406 subsequently transmits a trigger packet to local CPU 404 (step 610). The trigger packet comprises a command to write a predetermined trigger pattern to one or more predetermined bits in memory 410. Preferably the trigger packet is a Simple Network Management Protocol (SNMP) packet, although other protocols can be used.

The trigger packet traverses network 408, and arrives at network switch 402. One of network ports 412 receives the trigger packet (step 612). Protocol unit 418 identifies the trigger packet as a non-management packet by the absence of a management packet identifier in the packet (step 614). Protocol unit 418 sends the trigger packet to forwarding engine 416, which forwards the trigger packet to CPU port 414. CPU port 414 transmits the trigger packet to CPU 404 (step 616).

CPU 404 receives the trigger packet (step 618) and, in response to the trigger packet, sends a packet to network switch 402 comprising the command to write the predetermined trigger pattern to the one or more predetermined bits in memory 410 (step 620).

CPU port 414 receives the packet from CPU 404 (step 622). Protocol unit 418 identifies the packet as a management packet by the presence of a management packet identifier in the packet (step 624), and therefore sends the packet to management unit 420. Management unit 420 writes the predetermined trigger pattern to the one or more predetermined bits in memory 410 (step 626). Preferably the trigger pattern is a single bit that is written to a predetermined bit at a predetermined address in memory 410.

Management unit 420 executes the commands stored in memory 410 only when the one or more predetermined bits in memory 410 match the predetermined trigger pattern (step 628). Preferably management unit 420 occasionally reads the predetermined bits from memory 410 and compares the bits to the predetermined trigger pattern, although other techniques can be used.

Some embodiments age the stored commands so that very old commands cannot be executed. According to these embodiments, management unit 420 executes the commands stored in memory 410 only when the one or more predetermined bits in memory 410 match the predetermined trigger pattern during a predetermined interval following receiving the management packet comprising the one or more commands. The predetermined interval is selected according to the security level desired. The commands can be disabled at the end of the predetermined interval, for example, by deleting the commands from memory 410.

Figure 7:
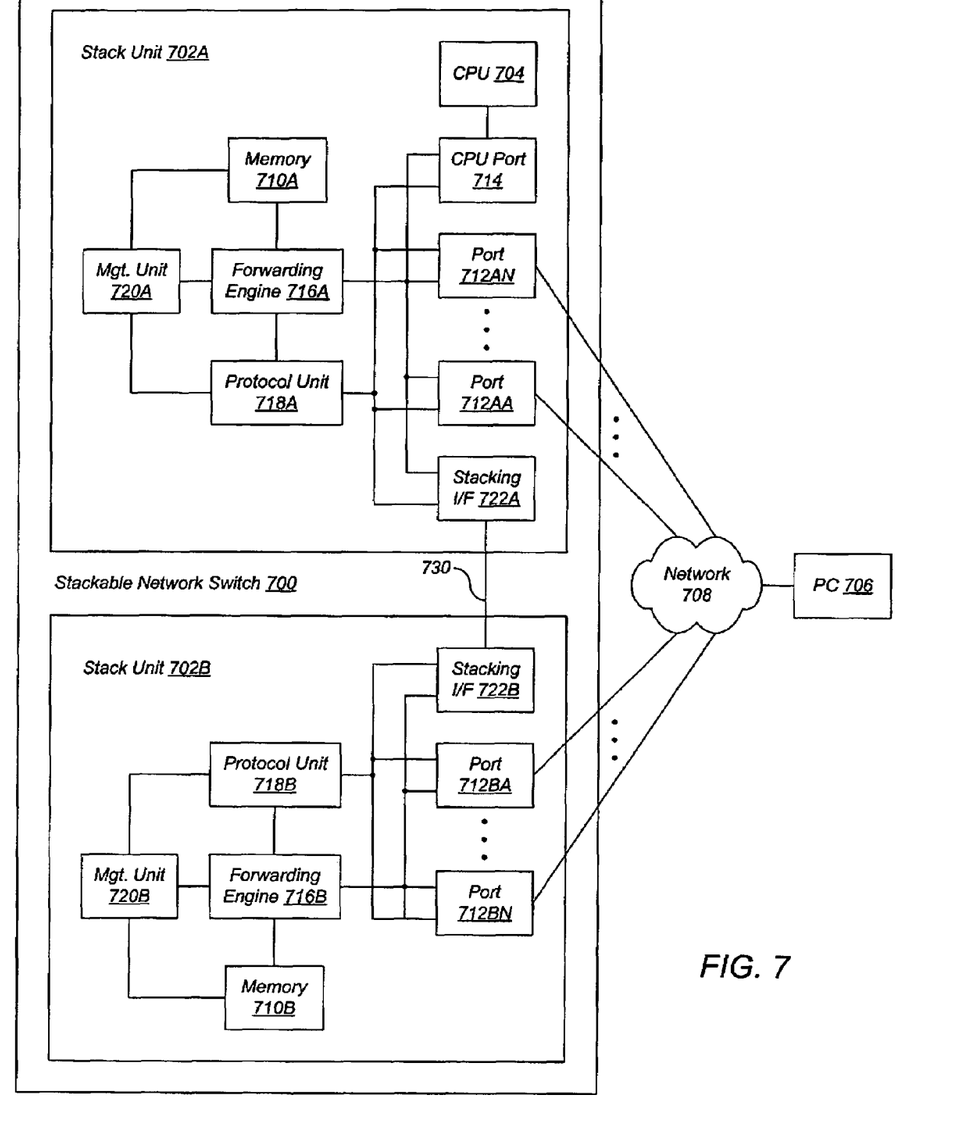
FIG. 7 shows a stackable network switch according to a preferred embodiment of the present invention.

Embodiments of the present invention can be used to implement a stackable network switch, that is, a network switch comprising one or more stack units each comprising a forwarding engine where a CPU in one of the stack units that manages all of the stack units. FIG. 7 shows a stackable network switch 700 according to a preferred embodiment of the present invention. Stackable network switch 700 comprises two stack units 702A and 702B in communication with a PC 706 over a network 708 such as a local-area network (LAN), wireless LAN, the Internet, and the like. Stack units 702A and 702B communicate with each other over a stacking link 730. Although for clarity only two stack units 702 are described, other embodiments can comprise more than two stack units 702.

Stack unit 702A comprises a memory 710A, a plurality of ports comprising one or more network ports 712AA through 712AN to send and receive data packets and to receive management packets and a CPU port 714, a CPU 704, and a stacking interface 722A. Stack unit 702A further comprises a forwarding engine 716A to transfer data packets between ports 712A and stacking interface 722A according to a forwarding table stored in memory 710A, a protocol unit 718A to identify the management packets, and a management unit 720A to execute the commands.

Stack unit 702B comprises a memory 710B, a plurality of ports comprising one or more network ports 712BA through 712BN to send and receive data packets and to receive management packets, and a stacking interface 722B. Stack unit 702B further comprises a forwarding engine 716B to transfer data packets between ports 712B and stacking interface 722B according to a forwarding table stored in memory 710B, a protocol unit 718B to identify the management packets, and a management unit 720B to execute the commands.

PC 706 can be used to manage stack unit 702A according to conventional methods. Embodiments of the present invention can be used to manage stack unit 702B as described above. For example, to manage stack unit 702B, PC 706 can send a management packet comprising one or more commands to stack unit 702B, which stores the commands in memory 710B. PC 706 can subsequently send an SNMP trigger packet to CPU 704, which causes the stored commands to be executed.

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
   means for storing data;
   plurality of port means comprising one or more network port means for sending and receiving data packets and for receiving management packets, wherein each of the management packets comprises one or more commands, and wherein the one or more commands comprise one or more of the group consisting of
  a command to read data from the means for storing, and
  a command to write data to the means for storing, and
central processing unit (CPU) port means for transmitting packets addressed to a CPU;
  forwarding engine means for transferring the data packets between the plurality of port means according to a forwarding table stored in the means for storing;
  protocol means for identifying the management packets; and
  management means for executing the one or more commands,
  wherein the management packets bypass the CPU port means, and
wherein the management means, upon receiving one of the management packets comprising the one or more commands, stores the one or more commands in the means for storing, and executes the one or more commands when predetermined bits in the means for storing match a predetermined trigger pattern during a predetermined interval following receiving the one of the management packets, and
wherein the predetermined interval is selected based on a desired security level.

2. The apparatus of claim 1:
wherein the CPU port means receives a packet comprising a command to write the predetermined trigger pattern to the predetermined bits in the means for storing; and
wherein the management means writes the predetermined trigger pattern to the predetermined bits in the means for storing.

3. The apparatus of claim 2:
wherein one of the one or more network port means receives a trigger packet addressed to the CPU,
wherein the forwarding engine means transfers the trigger packet to the CPU port mean; and
wherein the CPU port means receives the packet comprising the command to write the predetermined trigger pattern to the predetermined bits in the means for storing in response to the trigger packet.

4. A network switch comprising the apparatus of claim 1.

5. An apparatus comprising:
a first network switch comprising the apparatus of claim 1; and
a second network switch comprising the apparatus of claim 1 and further comprising the CPU,
wherein the CPU transmits one or more of the management packets to the first network switch.

6. A method for an apparatus comprising a memory and a plurality of ports comprising one or more network ports and a central processing unit (CPU) port, the method comprising:
sending and receiving data packets on the network ports;
transferring the data packets between the plurality of ports according to a forwarding table stored in the memory;
receiving management packets on the network ports, wherein each of the management packets comprises one or more commands, wherein the one or more commands comprise one or more of the group consisting of
  a command to read data from the memory, and
  a command to write data to the memory;
transmitting from the CPU port packets addressed to a CPU;
identifying the management packets;
storing the one or more commands in the memory upon receiving one of the management packets comprising the one or more commands; and
executing the one or more commands when predetermined bits in the memory match a predetermined trigger pattern during a predetermined interval following receiving the one of the management packets, wherein the management packets bypass the CPU port, and wherein the predetermined interval is selected based on a desired security level.

7. The method of claim 6, further comprising:
receiving a packet on the CPU port, the packet comprising a command to write the predetermined trigger pattern to the predetermined bits in the memory; and
writing the predetermined trigger pattern to the predetermined bits in the memory.

8. The method of claim 7, further comprising:
receiving a trigger packet addressed to the CPU on one of the one or more network ports;
transferring the trigger packet to the CPU port; and
receiving on the CPU port the packet comprising the command to write the predetermined trigger pattern to the predetermined bits in the memory in response to the trigger packet.

9. An apparatus comprising:
memory;
a plurality of ports including
  network ports to send and receive data packets and to receive management packets that include commands to read and write data in the memory, and
  a central processing unit (CPU) port to transmit packets addressed to a CPU;
a forwarding engine to transfer the data packets between the plurality of ports according to a forwarding table stored in the memory;
a protocol unit to identify the management packets; and
a management unit to execute the commands by bypassing the CPU,
wherein when one of the network ports receives a trigger packet comprising a command to write a predetermined trigger pattern to predetermined bits in the memory,
  the forwarding engine transfers the trigger packet to the CPU port,
  the CPU port transmits the trigger packet to the CPU and receives a response packet in response to the trigger packet from the CPU,
  the forwarding engine transfers the response packet to the management unit, and
  the management unit writes the predetermined trigger pattern to the predetermined bits in the memory and executes the commands stored in the memory when the predetermined bits in the memory match the predetermined trigger pattern during a predetermined interval following receiving one of the management packets, wherein the predetermined interval is selected based on a desired security level.

10. An apparatus comprising:
a memory;
a plurality of ports comprising
  one or more network ports to send and receive data packets and to receive management packets, wherein each of the management packets comprises one or more commands, and wherein the one or more commands comprise one or more of the group consisting of a command to read data from the memory, and
a command to write data to the memory, and
a central processing unit (CPU) port to transmit packets addressed to a CPU;
a forwarding engine to transfer the data packets between the plurality of ports according to a forwarding table stored in the memory;
a protocol unit to identify the management packets; and
a management unit to execute the one or more commands,
wherein the management packets bypass the CPU port, and
wherein the management unit, upon receiving one of the management packet comprising the one or more commands, stores the one or more commands in the memory, and executes the one or more commands when predetermined bits in the memory match a predetermined trigger pattern during a predetermined interval following receiving the one of the management packets, and
wherein the predetermined interval is selected based on a desired security level.

11. The apparatus of claim 10:
wherein the CPU port receives a packet comprising a command to write the predetermined trigger pattern to the predetermined bits in the memory; and
wherein the management unit writes the predetermined trigger pattern to the predetermined bits in the memory.

12. The apparatus of claim 11:
wherein one of the one or more network ports receives a trigger packet addressed to the CPU;
wherein the forwarding engine transfers the trigger packet to the CPU port; and
wherein the CPU port receives the packet comprising the command to write the predetermined trigger pattern to the predetermined bits in the memory in response to the trigger packet.

13. A network switch comprising the apparatus of claim 10.

14. An apparatus comprising:
a first network switch comprising the apparatus of claim 10; and
a second network switch comprising the apparatus of claim 10 and further comprising the CPU,
wherein the CPU transmits one or more of the management packets to the first network switch.

15. The apparatus of claim 14:
wherein the first network switch further comprises a first interface;
wherein the second network switch further comprises a second interface; and
wherein the first network switch and the second network switch communicate via the first and second interfaces.

* * * * *